(12) United States Patent
Cook

(10) Patent No.: US 8,294,988 B2
(45) Date of Patent: Oct. 23, 2012

(54) DUAL FIELD OF VIEW REFRACTIVE OPTICAL SYSTEM WITH EXTERNAL PUPIL AND INTERNAL STABILIZATION

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/874,680

(22) Filed: Sep. 2, 2010

(65) Prior Publication Data

US 2012/0057223 A1 Mar. 8, 2012

(51) Int. Cl.
G02B 27/64 (2006.01)
(52) U.S. Cl. .................... 359/557; 359/357; 359/672
(58) Field of Classification Search .................. None
See application file for complete search history.

(56) References Cited

U.S. PATENT DOCUMENTS

| | | | |
|---|---|---|---|
| 4,407,464 A | 10/1983 | Linick | |
| 4,453,087 A | 6/1984 | Linick | |
| 4,466,707 A | 8/1984 | Ikemori et al. | |
| 4,989,962 A * | 2/1991 | Kebo | 359/354 |
| 5,386,315 A | 1/1995 | Amon et al. | |
| 5,548,439 A | 8/1996 | Smith | |
| 5,625,499 A | 4/1997 | Chen | |
| 5,652,681 A | 7/1997 | Chen | |
| 5,691,842 A | 11/1997 | Devenyi et al. | |
| 5,796,514 A | 8/1998 | Chipper | |
| 5,852,516 A | 12/1998 | Chipper | |
| 5,973,827 A | 10/1999 | Chipper | |
| 6,091,551 A * | 7/2000 | Watanabe | 359/676 |
| 6,160,668 A * | 12/2000 | Rogers | 359/674 |
| 6,424,460 B1 * | 7/2002 | Kirkham | 359/353 |
| 6,989,537 B2 | 1/2006 | Cook | |
| 7,408,159 B1 * | 8/2008 | Amon | 250/339.01 |
| 7,626,150 B2 | 12/2009 | Chen | |
| 7,703,932 B2 | 4/2010 | Cook | |
| 7,813,644 B2 | 10/2010 | Chen | |
| 2004/0036982 A1 | 2/2004 | Chipper | |
| 2005/0001168 A1 * | 1/2005 | Amon et al. | 250/353 |
| 2007/0024978 A1 | 2/2007 | Jackson et al. | |
| 2008/0304167 A1 * | 12/2008 | Souma | 359/766 |
| 2009/0079824 A1 * | 3/2009 | Winsor | 348/143 |

FOREIGN PATENT DOCUMENTS

| | | |
|---|---|---|
| EP | 0762173 A2 | 3/1997 |
| EP | 2040106 A2 | 3/2009 |
| JP | 8114872 A | 5/1996 |
| WO | 2008108840 A1 | 9/2008 |

* cited by examiner

Primary Examiner — Lee Fineman
(74) Attorney, Agent, or Firm — Lando & Anastasi, LLP

(57) ABSTRACT

An optical system including a first lens group configured to correct for lateral chromatic aberration, and an adjacent second lens group configured to correct for axial chromatic aberration. The optical system includes a detector disposed behind the second lens group, a mechanism for switching the optical system between a narrow field of view configuration and a wide field of view configuration, and a ray path steering system including a pair of counter-rotating grisms disposed in front of the first lens group. The optical system also includes a stabilization system configured to suppress image jitter and including a mechanism for decentering at least one lens in the first or second lens groups orthogonal to an optical axis of the optical system. A pupil of the optical system is located external to the first and second lens groups for location of a cold shield within a cryo-vac Dewar enclosing the detector.

16 Claims, 3 Drawing Sheets

DUAL FIELD OF VIEW REFRACTIVE OPTICAL SYSTEM WITH EXTERNAL PUPIL AND INTERNAL STABILIZATION

BACKGROUND

This disclosure pertains to optical imagers in general and in particular to a dual field of view refractive optical system.

Demand for imaging sensors that provide wide area surveillance is increasing. Wide area surveillance can be used in various applications such as on an unmanned aerial vehicle (UAV) platform for target recognition. Wide area surveillance can be performed at various wavelength ranges depending on the desired application. The wavelength ranges of interest include short wavelength infrared radiation (SWIR) in the wavelength range between approximately 1 µm and 3 µm, mid wavelength infrared radiation (MWIR) in the wavelength range between approximately 3 µm and 5 µm, and long wavelength infrared radiation (LWIR) in the wavelength range between approximately 8 µm and 12 µm.

In certain applications, it is desirable to provide an optical system with a dual field of view capability: a wide field of view (WFOV) optical system to achieve a large area coverage at coarser spacial resolution and a narrow field of view (NFOV) optical system to achieve a smaller area coverage at finer spacial resolution. However, providing such dual capability may be challenging especially in the case where a small light weight optical package is sought, for example, for portability on UAVs.

SUMMARY

One or more embodiments of the present disclosure provide an optical system including a first lens group including a plurality of lenses, the first lens group being configured to correct for lateral chromatic aberration; and a second lens group including a plurality of lenses, the second lens group being configured to correct for axial chromatic aberration, the second lens group being disposed adjacent the first lens group. The optical system further includes a detector disposed behind the second lens group; a mechanism for switching a configuration of the optical system between a narrow field of view (NFOV) configuration and a wide field of view (WFOV) configuration; and a ray path steering system disposed in front of the first lens group, the ray path steering system comprising a pair of counter-rotating grisms configured to enhance a field of regard of the optical system. The optical system also includes a stabilization system configured to suppress image jitter, the stabilization system including a mechanism for de-centering at least one lens in the first lens group or in the second lens group orthogonal to an optical axis of the optical system. A pupil of the optical system is located external to the first and second lens groups behind the second lens group for location of a cold shield within a cryo-vac Dewar enclosing the detector.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
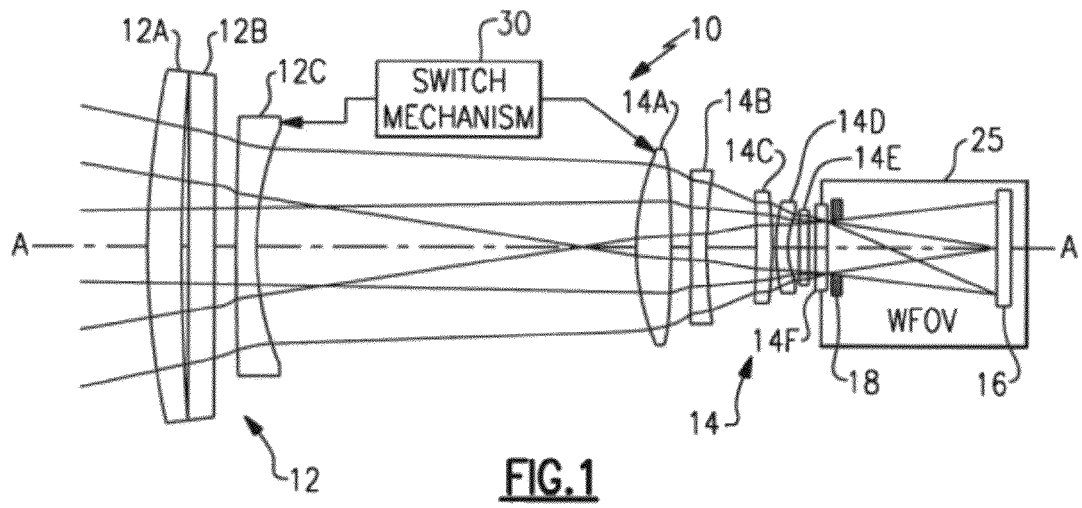
FIG. 1 depicts an optical imaging system in a wide field of view (WFOV) configuration, according to one embodiment.
Figure 2:
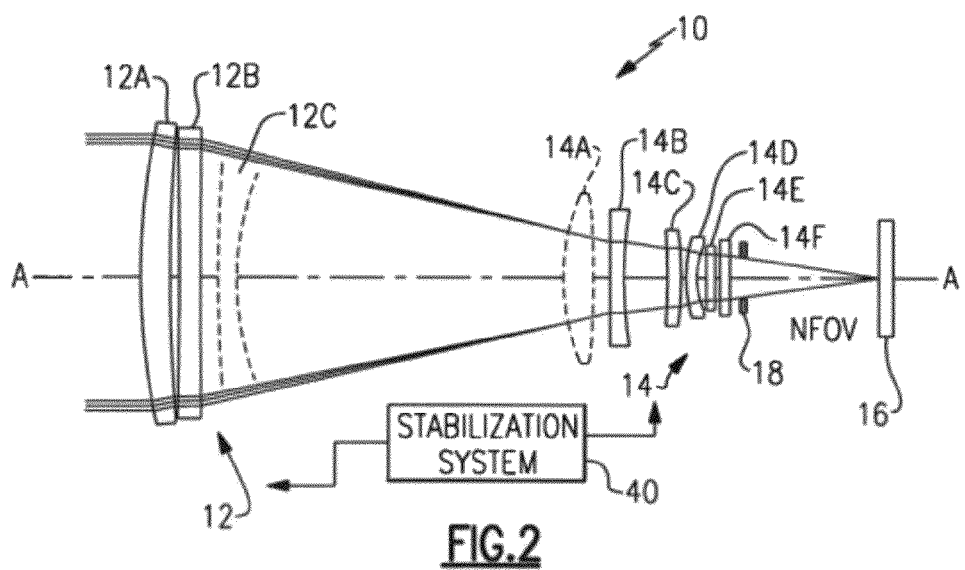
FIG. 2 depicts the optical imaging system in a narrow field of view (NFOV) configuration, according to one embodiment.

FIGS. 1 and 2 depict an optical imaging system providing dual field of view (FOV) in the MWIR range (3 µm to about 5 µm), according to one embodiment. FIG. 1 depicts the optical system in a wide field of view (WFOV) configuration and FIG. 2 depicts the optical system in a narrow field of view (NFOV) configuration. As shown in FIGS. 1 and 2, optical system 10 comprises first lens group 12 and second lens group 14. Optical system 10 further includes detector 16 such as, but not limited to, a focal plane array. In one embodiment, the detector 16 is selected to be sensitive in the MWIR wavelength range between about 3 µm and about 5 µm. However, the detector 16 can also be selected to be sensitive in other wavelength ranges such as SWIR and LWIR. Detector 16 is disposed behind second lens group 14. First lens group 12 and second lens group 14 capture radiation from a far field and focus the radiation onto detector 16.

In one embodiment, first lens group 12 comprises first lens element 12A, second lens element 12B and third lens element 12C. In one embodiment, first lens element 12A has a positive power, second lens element 12B has a negative power and third lens element 12C has a negative power. In one embodiment, lens element 12A, lens element 12B and lens element 12C are made from, respectively, Si, Ge, and an amorphous material transmitting infrared radiation (AMTIR), such as AMTIR-1 containing Ge (about 33%), As (about 12%) and Se (about 55%). Although first lens group 12 is described above and depicted in FIG. 1 as having three lens elements, first lens group 12 can have any number of lens elements, for example, two, three, four or more lens elements. In addition, although the first lens element 12A, second lens element 12B and third lens element 12C are made from the above listed material, these lens elements 12A, 12B, 12C can also be made from other optical material which are selected depending upon the desired range of wavelengths.

In one embodiment, second lens group 14 comprises first lens element 14A, second lens element 14B, third lens element 14C, fourth lens element 14D, fifth lens element 14E and sixth lens element 14F. In one embodiment, first lens element 14A has a positive power, second lens element 14B has a negative power, third lens element 14C has a positive power, and fourth lens element 14D has a negative power. In one embodiment, fifth and sixth lens elements 14E and 14F have substantially zero power. Fifth lens element 14E has substantially no curvature and thus substantially zero power. However, fifth lens element 14E is provided with an aspherical departure to correct for spherical aberration. In one embodiment, sixth lens element 14F is a plate and is provided as a cryo-vac Dewar window to separate the imaging optics 12 and 14 from the cold shielded detector 16 (provided within a cold shield or Dewar 25). In one embodiment, lens elements 14A, 14B, 14C, 14D, 14E and 14F are made from, respectively, As.sub.2S.sub.3, ZnS, AMTIR1, CaF.sub.2, Si, and Si. Although third lens group 14 is described above and depicted in FIGS. 1 and 2. as having six lens elements, third lens group 14 can have any number of lens elements, for example, two, three, or more lens elements.

In one embodiment, first lens group 12 is provided, inter alia, to correct lateral chromatic aberration. In one embodiment, second lens group 14 is provided, inter alia, to correct axial chromatic aberration. Second lens group 14 is further provided to correct field curvature to achieve a substantially planar focal surface or near zero Petzval sum on detector 16. For example, by providing a substantially planar focal surface or near zero Petzval sum on the detector this allows to minimize optical aberrations. Lens elements 12A-12C and 14A-14F are centered around axis AA to define the optical axis of optical system 10.

In one embodiment, the material from which the various lens elements in the optical system 10 are fabricated can be selected from a material transmitting in the MWIR wavelength range between about 3 μm and about 5 μm. However, the lenses can also be fabricated from materials transmitting in the SWIR, LWIR depending on the desired application.

As shown in FIG. 1, in the WFOV configuration, all the lens elements are traversed by the optical rays to achieve a wide field of view. Whereas, as shown in FIG. 2, in the NFOV configuration, lens element 12C in lens group 12 and lens element 14A in lens group 14 are not traversed by optical rays to achieve a narrow field of view. In one embodiment, in order to transform optical system 10 from the WFOV configuration into the NFOV configuration, or vice versa, a mechanism 30 is provided to move out the lens elements 12C and 14A from the path of radiation or move in lens elements 12C and 14A within the path for radiation. Alternatively, lenses 12A and 14A can be termed a drop-in Galilean attachment which transforms the NFOV configuration into the WFOV configuration when it is inserted into the optical path.

Figure 3:
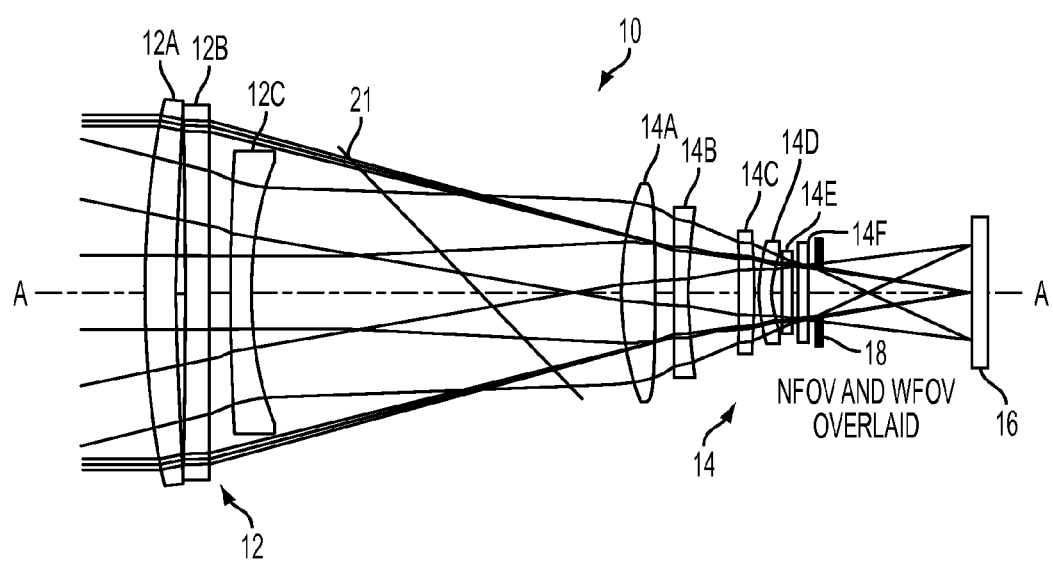
FIG. 3 depicts the optical system with a superposition of NFOV and WFOV optical paths.

FIG. 3 depicts optical system 10 with a superposition of the NFOV and WFOV optical paths, according to an embodiment. Optical system 10 is of a refractive telephoto form with an external rear aperture stop 18 positioned behind lens element or window 14F. The position of external rear aperture stop 18 corresponds to a position of an external pupil of optical system 10. In one embodiment, detector 16 is placed in a Dewar (not shown) for cold shielding detector 16, as generally known in the art. Optical system 10 further comprises flat fold mirror 21. Fold mirror 21 is used to modify a volume of the optical system from a long cylindrical profile to a shorter but wider profile. The use of flat fold mirror 21 allows to achieve volume reduction for packaging purposes.

Optical characteristics of optical system 10 are summarized in TABLE 1. In one embodiment, detector 16 is an FPA having 4000 by 4000 pixels. However, detector 16 can also be selected with any number of pixels and with any geometry including, square, rectangular, circular, etc. In one embodiment, a size of one pixel is approximately 10 μm. However, detector 16 can be provided with a different pixel size as desired. In one embodiment detector 16 is selected to operate in the wavelength range between about 3 μm and 5 μm, for example between about 3.8 μm and 4.2 μm. In one embodiment, the FOV achieved by optical system 10 in the WFOV configuration is approximately 26 deg. by 26 deg. (when using a square detector) or a 38 deg. diagonal. In one embodiment, the FOV achieved by optical system 10 in the NFOV configuration is relatively small (e.g., approximately 1 degree or less). In one embodiment, the focal length of optical system 10 in the WFOV configuration is approximately 3 inches and the focal length of optical system 10 in the NFOV configuration is approximately 15 inches. In one embodiment, a speed achieved by optical system 10 in the WFOV or NFOV configurations is approximately F/3. In one embodiment, an aperture of optical system 10 in the WFOV configuration is approximately 1 inch and in the NFOV configuration approximately 5 inches. In one embodiment, an instantaneous field of view (IFOV) of optical system 10 in the WFOV configuration is approximately 130 μrad and the IFOV of optical system is approximately 26 μrad.

TABLE 1

| PARAMETER | WFOV | NFOV |
| --- | --- | --- |
| FPA | 4K × 4K pixels pixel size: 10 μm | 4K × 4K pixels pixel size: 10 μm |
| FOV (deg.) | 26 deg. × 26 deg. (38 deg. diagonal) | small |
| Focal Length (inch) | 3.04 | 15.2 |
| Speed | F/3.0 | F/3.0 |
| Aperture (inch) | 1.015 | 5.07 |
| IFOV (μrad) | 130 | 26 |
| Waveband (μm) | 3.8-4.2 | 3.8-4.2 |

In one embodiment, for image motion or jitter compensation, lens elements 14B and 14C are de-centered orthogonal the optical axis AA to control the line of sight. This technique has certain limitations based on image quality as some coma may be introduced. In one embodiment, a stabilization system 40 is provided to suppress image jitter. The stabilization system 40 includes a mechanism for de-centering at least one lens in the first lens group or in the second lens group, or both, orthogonal to an optical axis of the optical system.

TABLE 2 lists various de-centering values of lens elements 14B and 14C relative to optical axis AA and obtained associated stabilization motion and a resulting root mean square value of wave front error (RMS WFE) (e.g., at the wavelength centered around 3.9 μm). In one embodiment, an RMS WFE value or range of values defines the image quality of an optical system at a certain radiation wavelength or in a certain range of radiation wavelengths.

TABLE 2

| Decenter (in.) | Stabilization Motion (μrad) | RMS WFE (wvs at 3.9 μm) | Comment |
| --- | --- | --- | --- |
| 0 | 0 | 0.0121 | Nominal Design |
| 0.0054 | 100 | 0.0195 | Negligible Degradation |
| 0.0108 | 200 | 0.0329 | Practical Useful Limit |
| 0.0162 | 300 | 0.0474 | Strehl Ratio = 0.91 |

TABLE 2 shows, for example, that if lens elements 14B and 14C are not decentered (decenter is equal to zero), the stabilization motion is equal to zero. In this configuration, the RMS WFE value is approximately 0.012 at a radiation wavelength centered around 3.9 μm. This corresponds to the nominal design of lens system 10. However, when the lens elements 14B and 14C are de-centered by about 0.0054 inch with a motion stabilization of 100 μrad, the RMS WFE increases slightly to about 0.0195 at a radiation wavelength centered around 3.9 μm. This shows a relatively negligible degradation of the wave front aberration. When the lens elements 14B and 14C are de-centered by about 0.0108 inch with a motion stabilization of 200 μrad, the RMS WFE further increases to about 0.0329 at a radiation wavelength centered around 3.9 μm. This corresponds to a practical useful limit in terms of wave front aberration.

TABLE 2 shows, for example, that ±200 μrads of stabilization motion control has a modest impact on wave front error and the de-center motion is only about ±0.0108 inches. The image quality of the nominal optical design is excellent with typical polychromatic wave front errors being in the range between about 0.01 and about 0.02 at a radiation wavelength centered around 3.8 μm across the field of view.

It may be desirable that one or both the WFOV and NFOV capabilities be pointable or steerable within a field of regard (FOR) that is larger than either. Alternatively, it may be desirable for the NFOV optical system to be steerable or pointable within a FOR that is approximately equal in size to the WFOV.

For relatively large angle, e.g., about ±26 deg., line of sight (LOS) steering of both the WFOV and NFOV paths within a FOR, a low weight alternative to a classical Az-El gimbal has been selected. In one embodiment, two rotating grisms 20 are used to steer the LOS. A grism is a prism having a diffraction grating on at least one of its faces. In one embodiment, the two counter-rotating grisms are made of silicon (Si). However, the two counter-rotating grisms can also be made from other optical materials, as needed. Although as described herein, the two prisms include diffraction grating surfaces, it is also contemplated that one or both of the prisms can have a diffraction grating surface.

Figure 4:
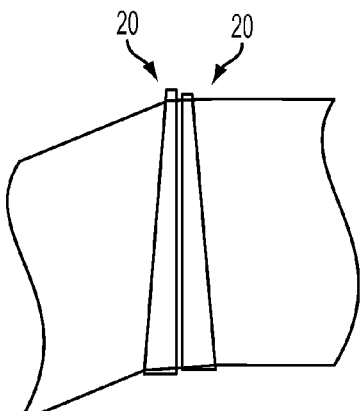
FIGS. 4, 5 and 6 depict two rotating grisms for steering a line of sight into optical system shown in FIGS. 1 and 2, according to one embodiment.
Figure 5:
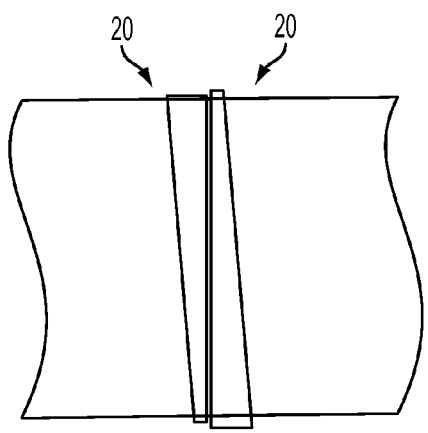
Figure 6:
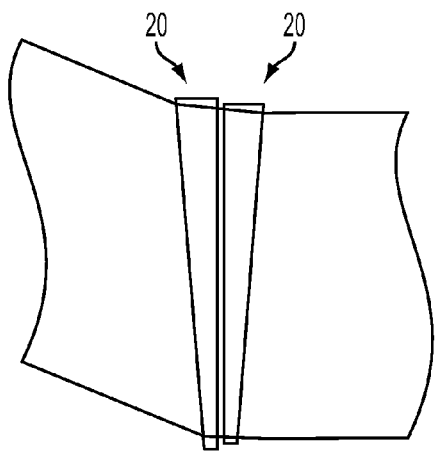

FIGS. 4, 5 and 6 show two rotating grisms 20 for steering the LOS into first and second lens groups 12 and 14, according to one embodiment. The two counter-rotating prisms 20 are disposed in front of lens group 12. Counter-rotating grisms 20 allow greater coverage of a viewed area by steering the ray paths from an angled direction to a parallel direction towards the imaging optics (lens groups 12 and 14). FIGS. 4, 5 and 6 depict the position of the counter-rotating prisms 20 with respect to each other and their associated steering effect.

error or the RMS WFE. For example, for a spectral band between about 3.4 μm and 4.2 μm, a prism angle of about 3.2 deg., a grating period of about 0.13 inch, and a PV lateral color of about 40 μrad, the obtained RMS WFE is approximately 0.15. For a spectral band between about 3.6 μm and 4.2 μm, a prism angle of about 3.2 deg., a grating period of about 0.14 inch, and a PV lateral color of about 21 μrad, the obtained RMS WFE is approximately 0.07. For a spectral band between about 3.8 μm and 4.2 μm, a prism angle of about 3.2 deg., a grating period of about 0.15 inch, and a PV lateral color of about 9 μrad, the obtained RMS WFE is approximately 0.03. In one embodiment, an RMS WFE of 0.03 provides a comfortable allocation, an RMS WFE of about 0.07 provides an acceptable allocation, and an RMS WFE of about 0.15 provides a degradation that is large. Therefore, the parameters are selected so as to achieve an RMS WFE smaller than 0.07 (an acceptable range).

TABLE 3

| Spectral Band (μm) | Prism Angle (deg.) | Grating Period (in) | PV Lateral Color (μrad) | RMS WFE (wvs) | Comment |
| --- | --- | --- | --- | --- | --- |
| 3.4-4.2 | 3.2101 | 0.1305 | 40 | 0.149 | Degradation Large |
| 3.6-4.2 | 3.2125 | 0.1425 | 21 | 0.074 | Acceptable |
| 3.8-4.2 | 3.2146 | 0.1548 | 9 | 0.029 | Comfortable Allocation |

An extrapolation from TABLE 3 indicates that for ±26 deg. steering, for a spectral band between about 3.7 μm and 4.2 μm, and for a grating period of about 0.149 inch, the worst lateral color degradation of the polychromatic wave front error is about 0.045 at 3.8 μm. An RMS WFE of about 0.045 is below 0.07 and thus within an acceptable range.

TABLE 5

| Element | RD | Ad | Ae | Af | Ag | Thk | Matl |
| --- | --- | --- | --- | --- | --- | --- | --- |
| 1 Lens 12A | 14.751 | | | | | 0.500 | Si |
| 2 | 88.600 | | | | | 0.133 | air |
| 3 Lens 12B | -51.809 | | | | | 0.350 | Ge |
| 4 | -173.242 | -1.187E-05 | -2.208E-07 | -1.762E-10 | -1.127E-11 | 0.310 | air |
| 5 Lens 12C | 31.702 | -1.510E-03 | -5.310E-06 | -2.500E-06 | 4.101E-07 | 0.300 | Amtir1 |
| 6 | 5.472 | | | | | 5.619 | air |
| 7 Lens 14A | 5.070 | | | | | 0.500 | As2S3 |
| 8 | -11.326 | 4.135E-03 | -2.890E-04 | 2.304E-05 | -1.007E-06 | 0.310 | air |
| 9 Lens 14B | -31.119 | | | | | 0.200 | ZnS |
| 10 | 9.138 | | | | | 0.736 | air |
| 11 Lens 14C | -24.773 | | | | | 0.250 | Amtir1 |
| 12 | -8.013 | | | | | 0.058 | air |
| 13 Lens 14D | 3.077 | | | | | 0.200 | CaF2 |
| 14 | 1.865 | | | | | 0.150 | air |
| 15 Corrector 14E | inf | | | | | 0.150 | Si |
| 16 | inf | -2.663E-04 | -1.166E-03 | 5.967E-03 | -6.720E-03 | 0.100 | air |
| 17 Window 14F | inf | | | | | 0.150 | Si |
| 18 | inf | | | | | 0.100 | air |
| 19 Stop 18 | inf | | | | | 2.402 | air |
| 20 FPA 16 | inf | | | | | n/a | n/a |

In one embodiment, the diffraction grating on a surface of grism 20 is provided to cancel a linear component of the Si material dispersion. A non-linear dispersion component may cause lateral color dispersion in the imagery if the spectral band is very wide.

TABLE 3 summarizes various parameters including the spectral band, the prism angle, the lateral color dispersion (PV Lateral Color) and grating period affecting the wave front In one embodiment, the stop diameter is about 0.8 inch and the range of radiation wavelength is between about 3.6 μm and about 4.2 μm.

TABLE 5 lists the various optical surfaces of optical system 10 and their respective radii of curvature (RD), aspheric coefficients (AD), (AE), (AF), and (AG), thickness (Thk), and type of material (Matl) when applicable, according to one embodiment. With his optical prescription, optical system 10 achieves an F-number or speed of about F/3 with a focal length of about 15 inches in the NFOV configuration and about 3 inches in the WFOV configuration, and a FOV of about 0.2 deg. in the NFOV configuration and a FOV of about 38 deg. in the WFOV configuration, as shown in TABLE 6. It should be noted that the total axial length of the optical system detailed in TABLE 5 is about 12.5 inches, while the focal length of the NFOV is about 15.2 inches. Whenever the physical length of an optical system is shorter than the effective focal length, the optical system is described as being telephoto. In this embodiment, the physical length is approximately 82% of the effective focal length.

TABLE 6

| Parameter | NFOV | WFOV | units |
|---|---|---|---|
| Aperture | 5.070 | 1.014 | inch |
| Focal length | 15.208 | 3.042 | inch |
| F-number | 3.00 | 3.00 | n/a |
| FOV | 0.2 | 38.0 | deg. |

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. An optical system comprising:
   a first lens group comprising a plurality of lenses, the first lens group being configured to correct for lateral chromatic aberration; and
   a second lens group comprising a plurality of lenses, the second lens group being configured to correct for axial chromatic aberration, the second lens group being disposed adjacent the first lens group,
   a detector disposed behind the second lens group;
   a mechanism for switching a configuration of the optical system between a narrow field of view (NFOV) configuration and a wide field of view (WFOV) configuration;
   a ray path steering system disposed in front of the first lens group, the ray path steering system comprising a pair of counter-rotating grisms configured to enhance a field of regard of the optical system; and
   a stabilization system configured to suppress image jitter, the stabilization system including a mechanism for decentering at least one lens in the first lens group or in the second lens group orthogonal to an optical axis of the optical system;
   wherein a pupil of the optical system is located external to the first lens group and second lens group for placement of a cold shield within a cryo-vac Dewar enclosing the detector; and
   wherein the second lens group comprises a first lens element having a positive power, a second lens element having a negative power, a third lens element having a positive power, a fourth lens element having a negative power, and fifth and sixth lens elements having substantially zero power.

2. The optical system of claim 1, wherein the first lens group comprises a seventh lens element having a positive power, an eighth lens element having a negative power, and a ninth lens element having a negative power.

3. The optical system of claim 2, wherein the first seventh lens element, the eighth lens element and the ninth lens element comprise, respectively, Si, Ge, and an amorphous material transmitting infrared radiation (AMTIR-1).

4. The optical system of claim 1, wherein the fifth lens element is provided with an aspherical departure to correct for spherical aberration.

5. The optical system of claim 1, wherein the sixth lens element is a plate and is provided to separate first and second lens groups from the cold shield within the cryo-vac Dewar containing the detector.

6. The optical system of claim 1, wherein the first lens element, the second lens element, the third lens element, the fourth lens element, the fifth lens element and the sixth lens element comprise, respectively, $As_2S_3$, ZnS, AMTIR-1, $CaF_2$, Si, and Si.

7. The optical system of claim 1, wherein the second lens group is configured to correct field curvature and achieve a substantially planar focal surface or a near zero Petzval sum at the detector so as to reduce optical aberrations.

8. The optical system of claim 1, wherein a field of view of the optical system in the NFOV configuration is less than 1 degree.

9. The optical system of claim 1, wherein a field of view of the optical system in the WFOV configuration is greater than 26 degrees.

10. The optical system of claim 1, wherein the mechanism for switching the configuration of the optical system between the NFOV configuration and the WFOV configuration comprises a mechanism configured to move at least one lens in the first group and at least one lens in the second group.

11. The optical system of claim 1, further comprising a flat fold mirror disposed between the first lens group and the second lens group, the fold minor adapted to modify a volume of the optical system from a long cylindrical profile to a shorter wider profile.

12. The optical system of claim 1, wherein a focal length of the optical system in the WFOV configuration is approximately 3 inches to achieve a wide field of view.

13. The optical system of claim 1, wherein a focal length of the optical system in the NFOV configuration is approximately 15 inches to achieve a narrow field of view.

14. The optical system of claim 1, wherein a speed of the optical system is approximately F/3.

15. The optical system of claim 1, wherein a diffraction grating period of the counter-rotating grisms is selected so as to achieve an RMS WFE value smaller than approximately 0.07.

16. The optical system of claim 1, wherein the optical system is a telephoto optical system.

* * * * *

UNITED STATES PATENT AND TRADEMARK OFFICE
CERTIFICATE OF CORRECTION

| | |
|---|---|
| PATENT NO. | : 8,294,988 B2 |
| APPLICATION NO. | : 12/874680 |
| DATED | : October 23, 2012 |
| INVENTOR(S) | : Lacy G. Cook |

It is certified that error appears in the above-identified patent and that said Letters Patent is hereby corrected as shown below:

In Claim 3, column 8, line 14, "first" should be omitted.

In Claim 11, column 8, line 48, "minor" should be replaced with --mirror--.

Signed and Sealed this
Twenty-seventh Day of November, 2012

David J. Kappos
*Director of the United States Patent and Trademark Office*